(No Model.)

J. MOHRING
GAGE KNIFE.

No. 435,632.      Patented Sept. 2, 1890.

Witnesses:
Geo. R. Paul
Daniel H. Herr.

Inventor
John Mohring
By his Attorney
Wm. R. Gerhart

UNITED STATES PATENT OFFICE.

JOHN MOHRING, OF LANCASTER, PENNSYLVANIA.

GAGE-KNIFE.

SPECIFICATION forming part of Letters Patent No. 435,632, dated September 2, 1890.

Application filed October 3, 1889. Serial No. 325,947. (No model.)

*To all whom it may concern:*

Be it known that I, JOHN MOHRING, a citizen of the United States, residing in Lancaster, in the county of Lancaster and State of Pennsylvania, have invented certain Improvements in Vegetable-Knives, of which the following is a specification.

My invention relates to improvements in knives for paring vegetables and fruit and for scraping and cutting the same; and the object of my improvement is to produce a knife which can be made easily and cheaply and which will serve equally well for either of the purposes mentioned.

To this end my invention may be briefly stated to consist in the combination, with a supporting-handle, of a sheet-metal plate having a longitudinal sharp cutting-edge and provided with a straight or curved transverse slot near the front end, the front edge of which is turned outward on one side to form a paring-blade, the front end of the plate being turned in the opposite direction to form a scraper.

My invention is illustrated in the accompanying drawings, in which—

Figure 1:
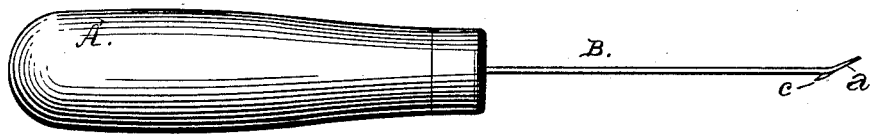
Figures 3, 4:
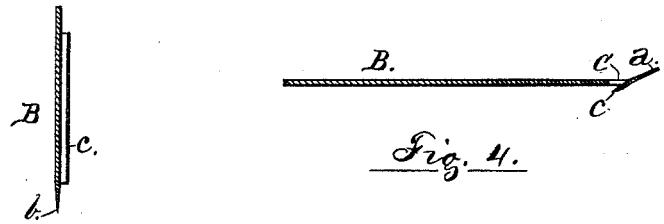
Figure 2:
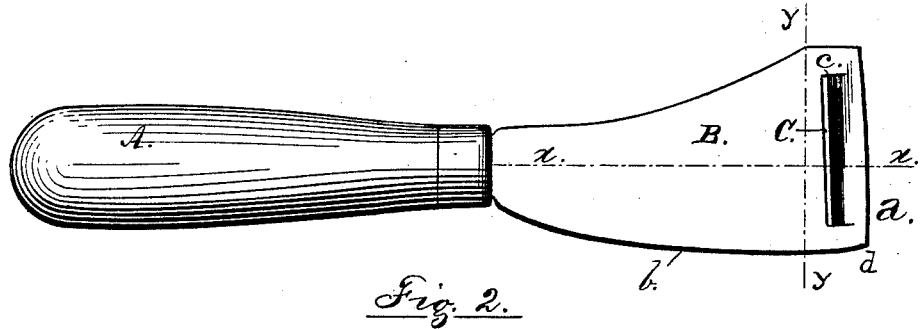

Figure 1 is a top or upper edge view of my improved vegetable-knife. Fig. 2 is a side view of the same. Fig. 3 is a vertical section through the line $y\ y$ of Fig. 2, and Fig. 4 a longitudinal section through the line $x\ x$ of the same figure.

Similar letters indicate like parts throughout the several views.

In the drawings, A represents the handle, and B a blade of sheet metal, having the lower edge $b$ sharpened, as is the case with the blades of other knives.

C is a transverse slot cut through the blade B near its forward end, the front edge $c$ whereof is bent outward and sharpened to form a paring-blade. This blade is used by holding the fruit or vegetable in one hand and drawing the knife over it in the direction of the handle, the knife cutting to a uniform depth without waste of material or any special care or effort on the part of the operator. The slot C is cut sufficiently near the front end of the blade B to permit the end $a$ thereof to be bent outward in a direction opposite to that in which the paring-blade $c$ is bent at the same time and by the same operation, the bending of the forward edge of the slot C tending naturally to throw the front end of the blade B in the opposite direction. This edge $a$ thus becomes an efficient scraper by which very light skin—such as is too thin to require the use of a vegetable-blade—or particles of the heavier skin remaining after the blade $c$ has been used may be removed. One corner $d$ of the blade B is sharpened to cut out the eyes of potatoes or remove rot or the paring from abrupt depressions in the fruit or vegetables, the main blade B being used to cut the vegetables into quarters or halves or for slicing.

I am aware that blades for paring and slicing vegetables and fruit have been made in the same way as my blade to be used for that purpose. I do not therefore claim the paring-blade, broadly; but

What I claim as new, and desire to secure by Letters Patent, is—

A vegetable-knife B, having the longitudinal cutting-edge $b$, transverse paring-blade $c$, formed near the forward end of the knife, and the end of the knife turned outward on the side opposite to that from which the paring-blade projects to form a scraper $a$, substantially as and for the purpose specified.

JOHN MOHRING.

Witnesses:
I. C. ARNOLD,
WM. R. GERHART.